No. 836,570. PATENTED NOV. 20, 1906.
A. R. FITCH.
MUSIC CHART.
APPLICATION FILED OCT. 15, 1904.

Witnesses:
Clara Hill Shetler
Christiann McCrea

Inventor:
Abbie Ruth Fitch

UNITED STATES PATENT OFFICE.

ABBIE RUTH FITCH, OF DENVER, COLORADO, ASSIGNOR OF ONE-HALF TO CLARA H. SHETLER, OF DENVER, COLORADO.

MUSIC-CHART.

No. 836,570.      Specification of Letters Patent.      Patented Nov. 20, 1906.

Application filed October 15, 1904. Serial No. 228,646.

*To all whom it may concern:*

Be it known that I, ABBIE RUTH FITCH, a citizen of the United States, residing at No. 3041 Fillmore street, in the city and county of Denver and State of Colorado, have invented a new, original, and instructive Music-Chart, together with board and pawns especially designed for playing the same, and which I hereby designate the "Zenith music game," of which the following is a specification.

This invention relates to improvements in charts or game-boards for the study of different musical combinations and the various relations of notes or tones to each other in certain scales or keys.

The invention has for its object the provision of a chart or board so arranged that the selecting and arranging of tones for all musical scales, chromatic and major and minor diatonic, may be easily accomplished.

It is a further object of the invention also to facilitate the showing in a new and simple manner the relation of major keys to their relative minor keys.

It is also within the objects of the invention to demonstrate the laws of harmony by resolving each scale into its three harmonious combinations called "chords."

It is a still further object of the invention to so arrange the chart or game-board that the relation of the different tones to the keys of a musical instrument—such, for instance, as those of a piano or organ—may be made clearly apparent, as well as the coincidence of the arrangement of the scales and chords in all keys.

With these and other objects in view my invention comprises certain other novel constructions, combinations, and arrangements of parts, as will be hereinafter fully described and claimed.

Figure 1:
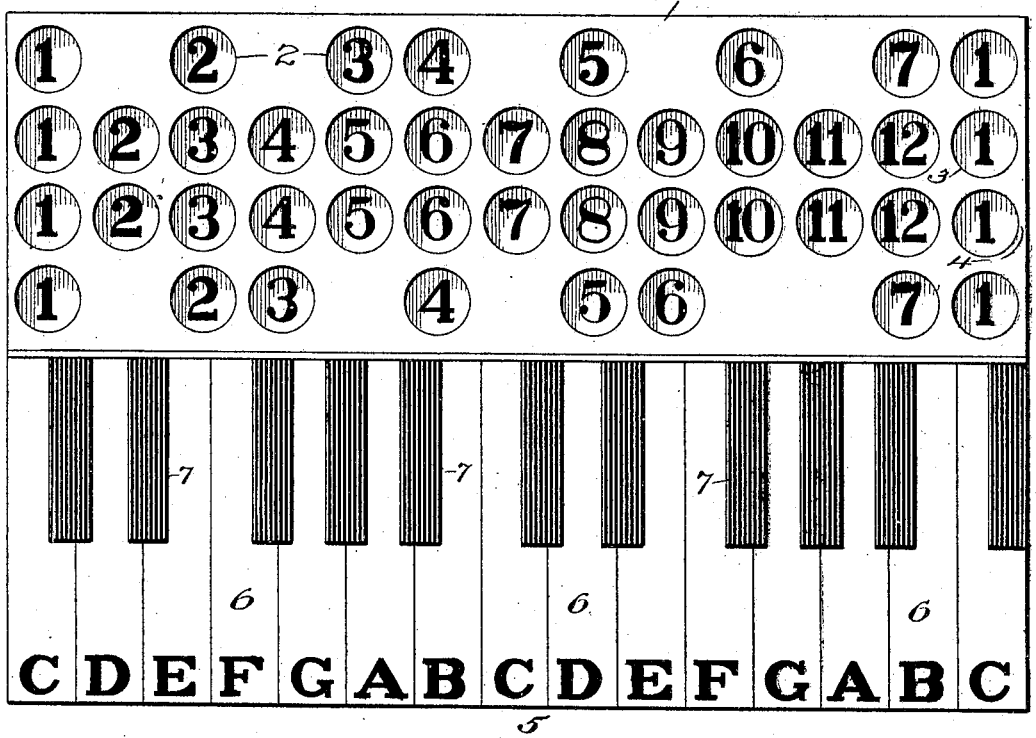
Figure 2:
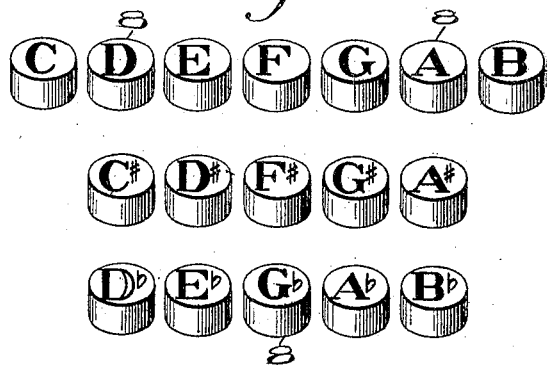

In the accompanying drawings, Figure 1 is a plan view of my improved chart or game-board. Fig. 2 is a detailed perspective view showing the men or pieces employed in using the chart or playing the game.

The chart or game apparatus forming the subject-matter of this invention is so constructed that the intervals of tones and half-tones in different scales or keys may be readily and quickly learned by the user of the chart or board, and the continued use of the apparatus will render it easy for the operator to transpose from key to key, and thus overcome one of the difficulties encountered in obtaining the proper knowledge of music.

In the illustration accompanying the application, 1 indicates a chart or board the upper face portion of which is provided with a series of indications, preferably including the numbers from "1" to "12" and beginning with "1" again. The indications may be placed upon the surface of the board or are preferably formed in the bottom of recesses 2. A recess 2 is provided for each number or indication and for the purpose of carrying out the game, and two central rows of recesses extend entirely across the chart, providing a sufficient number of depressions for thirteen game-pieces or men. Above the upper row of the spaces 3 is another row; but the recesses of this latter row have intervals between them which are to correspond with the intervals in certain musical scales. The recesses of this upper row are marked "1," "2," "3," "4," "5," "6," "7," and "1" and are arranged opposite the recesses in the row 3, which are marked "1," "3," "5," "6," "8," "10," "12," and "1." Below the lower central row 4 of recesses is another row having intervals at suitable points, and in this lower row recesses marked "1," "2," "3," "4," "5," "6," "7," and "1" are arranged opposite the upper recesses designated by the numerals "1," "3," "4," "6," "8," "9," "12," and "1."

The lower face of the game-board, as 5, is provided with marked indications or formations showing the usual white and black keys 6 and 7, respectively, of the ordinary piano-keyboard or organ-keyboard. For further rendering the chart effective in the rapid teaching of music or playing of the game the white keys 6 are provided with letters indicating the names of the tones which are played by each of said keys. Of course the black keys indicate the sharps and flats of these tones, as is usual.

In Fig. 2 a number of pawns, men, or game-pieces are shown at 8, which have designations thereon indicating the tones of musical scales. Some of said pawns indicate natural tones, while others are marked with sharps and flats.

In the use of the game-board or chart the central rows of apertures are supplied with pawns arranged so as to indicate chromatic scales, which scales of course are made up of seven regular and five intermediate tones occurring in alphabetical order, and the said tones progress in half-steps.

As the diatonic scales are grouped in series of eight tones and progress by steps and half-steps, the upper and lower rows of recesses are so arranged as to indicate the proper relation of the tones with respect to each other. There are twenty-four scales and keys in general use, twelve major and twelve minor, and therefore major diatonic scales and minor diatonic to the number of twelve may be commenced or based upon each of the twelve tones in an octave, and these scales differ only in order of their steps and half-steps. This difference in the order of their steps is indicated by the position of the extreme upper and lower rows of recesses in their position opposite the intermediate rows of apertures for the half-step tones of the chromatic scale.

In using the chart for establishing and impressing upon the mind various scales the chromatic scale for the desired major scale is arranged by placing the proper pawns in the row of apertures 3 and then arranging in the row immediately below the pawns indicating the corresponding chromatic scale for the relative minor scale—for instance, in row 3 the chromatic scale beginning with C and in the bottom row the chromatic scale beginning with A. The pawns which are then found in the recesses opposite the recesses at the top of the board are selected and placed in said recesses, with the result that a major diatonic scale in the key of C is produced having the proper full and half-length intervals between the tones. The corresponding or relative minor diatonic scale in the key of A is then formed by placing the pawns found in the chromatic recesses which are opposite the apertures in the lowest row. This arrangement of the pawns in the lower apertures will be found to be the same as in the major scale, except in the order of the letters composing it and with this further difference that the seventh of the scale will always be just a half tone or step higher than the fifth of the major scale in the upper row.

In using the board for game purposes the game may be played "solitary" by a single individual, if desired, or may be practiced or played by two persons, in which case one of the players arranges the major scales in the upper two rows of the apertures in the board and the other player the minor scales in the two lower rows of apertures. The one first finishing the arranging the selection of their respective scales correctly may be considered the winner of the game. The test of correctness is found in the comparing of the upper and lower rows of pawns after they have been selected, which must be identical except in their order and in their fifth major and seventh minor letters. The failure of the two scales thus to correspond indicates a mistake in one or both of the players, and such mistake may be made to forfeit the game to the party who made no mistake. If both make mistakes, neither party wins the game.

After having mastered the art of selecting and arranging of the major and minor scales correctly upon the board the separating of each scale in the harmonious groups according to the laws of harmony may then be played or practiced. Such separation of the scales requires the combination of pawns corresponding with the first, third, and fifth of the scale for one chord and the fourth, sixth, and eighth of the scale for another chord and the second, fifth, and seventh of the scale for the third chord, and the selection of pawns from the apertures in the game-board containing these numbers and grouped in threes will constitute the chord changes in any key, whether major or minor. Players may use pencil and paper to select chords, and the first one finishing correctly may be considered the winner of the game.

The arrangement of the numbered apertures and the lettered pawns with respect to the keys of a pianoforte will be found useful in familiarizing the player or student with the tones which always go with certain keys.

The chart or game-board constructed in accordance with the above description will be found not only very effective for the purpose of imparting knowledge of the musical scales to a student, but will also be found to be exceedingly accurate, and the apparatus will also afford means for amusement, which will not only provide recreation, but be instructive at the same time.

Having described my invention, what I claim as new, and desire to secure by Letters Patent, is—

A musical chart, comprising a board formed with a plurality of rows, of recesses equally spaced in each row, and arranged and designated to correspond with the order of the intervals in chromatic scales, a row of recesses above said equally-spaced recesses, spaced and designated to correspond with the order of intervals of the major diatonic scale related to the chromatic scale indicated by the upper row of equally-spaced recesses, a row of recesses below the equally-spaced recesses and spaced and designated to correspond with the order of intervals of the minor diatonic scale related to the chromatic scale indicated by the lower row of equally-spaced recesses, a plurality of blocks proportioned for insertion into the recesses, and designated by letters representing the natural notes of an octave, and other similar blocks designated by letters and symbols representing the several sharps and flats of said naturals in their related major and minor diatonic scales.

In testimony whereof I have signed my name to this specification in the presence of two subscribing witnesses.

ABBIE RUTH FITCH.

Witnesses:
 CLARA HILL SHETLER,
 CHRISTIANN MCCREA.